United States Patent [19]

Snape

[11] 4,273,266
[45] Jun. 16, 1981

[54] METHOD AND APPARATUS FOR DISCHARGING MATERIAL FROM BULK CONTAINERS

[75] Inventor: George W. Snape, Shipston-on-Stour, England

[73] Assignee: Bulk Unit Load Systems Limited, London, England

[21] Appl. No.: 24,175

[22] Filed: Mar. 26, 1979

[30] Foreign Application Priority Data

Mar. 23, 1978 [GB] United Kingdom ............... 11698/78

[51] Int. Cl.³ .......................... B67D 5/06; B65G 69/00
[52] U.S. Cl. ................................ 222/199; 198/540; 222/203
[58] Field of Search ............... 222/198, 202, 203, 199, 222/200; 198/535, 536, 540, 550

[56] References Cited

U.S. PATENT DOCUMENTS

| | | | |
|---|---|---|---|
| 2,098,034 | 11/1937 | Flint et al. | 222/199 X |
| 2,100,315 | 11/1937 | Harper | 222/199 X |
| 2,161,342 | 6/1939 | Francis | 222/202 X |
| 2,323,864 | 7/1943 | Weyandt | 222/199 X |
| 2,446,752 | 8/1948 | Fiddyment | 222/198 X |
| 2,588,030 | 3/1952 | Musschoot et al. | 198/535 X |
| 2,953,282 | 9/1960 | Peterson | 222/196 |
| 3,432,079 | 3/1969 | Williams | 222/199 |

*Primary Examiner*—David A. Scherbel
*Attorney, Agent, or Firm*—Bacon & Thomas

[57] ABSTRACT

The apparatus comprises a bulk container having a discharge opening in its base, and vibratory tray feeder for conveying material from the discharge opening of the container to a second discharge opening. The tray feeder has an inlet connected to the discharge opening of the container by a flexible portion. To assist the passage of the material from the container to the tray feeder, the tray feeder is vibrated in a manner which transmits vibrations through the flexible portion of the connecting means to the container. The container may be a fixed container or part of a mobile unit in which the container and the tray feeder are supported on the same frame.

8 Claims, 3 Drawing Figures

METHOD AND APPARATUS FOR DISCHARGING MATERIAL FROM BULK CONTAINERS

BACKGROUND OF THE INVENTION

1. Field of the Invention

This invention relates to a method and apparatus for discharging material from bulk containers.

2. Prior Art

It is known from British Patent Specification No. 1,345,002 to provide a bulk container with a bottom opening and legs which support the container on a vibratory support frame for discharging material in the container through the opening into, for example, a chute disposed beneath the opening. The discharge opening is closable by a trap which opens downwardly into a casement connected by a flexible discharge duct to the chute. In use, the vibratory support frame has feet which rest on a fixed frame. The material is discharged from the container partly by gravity and partly by forced vibrations applied to the container by vibrating the support frame, the vibrations being transmitted to the container through the container's legs. When the container is empty, it is removed and another full container is placed on the vibratory support frame.

It is also known from British Patent Specification No. 1,465,065 to provide the same container and vibratory support frame with a hopper arranged to collect material discharged from the container, the hopper being connected to the discharge opening of the container by a duct including a flexible, bellows type portion. The hopper is also supported on a second vibratory frame having means for vibrating the second vibratory frame and the hopper relative to the first vibratory frame supporting the container. The second vibratory frame is suspended from the first vibratory frame by suspension means including means for isolating the second vibratory frame from the first vibratory frame whereby the transmission of vibrations between the frames is minimised. In use, a chute is located beneath the discharge opening of the hopper for directing the material into a second container or onto, for example, a conveyor belt. For some materials which are readily dischargeable, the effect of vibrating the second support frame may make it possible not to vibrate the first support frame for at least some of the time that the material is being discharged. However, in this known system it is intended that means should always be provided for vibrating the first support frame directly, and that such means are operated in association with the vibrating means on the second support frame.

SUMMARY

According to the invention there is provided a method of discharging material from a bulk container, the container having a discharge opening in its base, and vibratory delivery means for conveying material from said opening of the container to a second discharge opening, the delivery means being connected to the opening of the container by means including a flexible portion, characterised in that to assist the passage of the material from the container to the delivery means, the method comprises forming the flexible portion so that it is convergent in the downward direction and vibrating the delivery means in a manner which transmits vibrations through the flexible portion of the connecting means to the container.

The invention also provides apparatus for discharging material from a bulk container having a discharge opening in its base, vibratory delivery means for conveying material from said opening of the container to a second discharge opening, the delivery means having an inlet connected to the discharge opening of the container by means including a flexible portion, means for vibrating the delivery means, characterised in that to assist the passage of the material from the container to the delivery means the flexible portion is convergent in the downward direction and is arranged to transmit vibrations from the delivery means to the container.

The invention may be applied to the discharging of material from a fixed container, e.g. a silo or hopper. However, it is preferred that the apparatus as defined above comprises a mobile unit, there being provided a frame for supporting both the container and the delivery means.

Preferably the frame is constructed so that vibrations from the delivery means are fed through the frame to the container.

It is also preferred that the apparatus includes a second support frame, the frame of the mobile unit having feet for resting on the second frame, and the second frame providing means for minimising the transmission of vibrations from the delivery means to the second frame.

Control means for the delivery means may also be mounted on said second frame, the control means being coupled to the delivery means by quick-release couplings to allow ready removal of the mobile unit from the second frame.

Preferably the flexible portion of the connecting means comprises a longitudinal wall defining a passage for allowing the material to pass from the container to the delivery means and two external flanges for attaching the connecting means to the container adjacent its discharge opening and to the delivery means adjacent its inlet respectively. The longitudinal wall and both flanges of the connecting means are preferably formed of a flexible and substantially non-stretchable material. The longitudinal wall may also extend beyond the flange attaching the connecting means to the delivery means whereby the longitudinal wall projects a desired distance into the delivery means.

The longitudinal wall of the connecting means defines a convergent passage which may have a rectangular or circular cross-section corresponding to the shape of the discharge opening of the container. The longitudinal wall may also initially be inwardly convex, e.g. hyperbolic.

Preferably means are provided for increasing the tautness of the top portion of the longitudinal wall of the flexible portion, which means comprises a plurality of tapes attached to the longitudinal wall externally thereof and means for holding the tapes tight.

The delivery means may conveniently be a pneumatically operated tray feeder capable of discharging material at a variable rate of feed. Alternatively, the delivery means may be an electrically activated feeder having an electro-magnetic actuator or a hydraulic vibrator having an electrically driven pump, or may be other means such as a screw conveyor.

The delivery means may be hinged to allow the angle of the delivery means relative to the direction of flow of the material from the container to be varied.

DESCRIPTION OF THE PREFERRED EMBODIMENT

This example is concerned with discharging material from a bulk container either continuously or intermittently and at a variable rate of feed.

It will thus be appreciated that the bulk container may be of any desired size, and may be a container whose contents are required to be discharged over a short or long continuous period of time, or alternatively a container for holding material of which only small amounts are required for a particular process at any one time, the material being held in stock for intervening periods.

Figure 1:
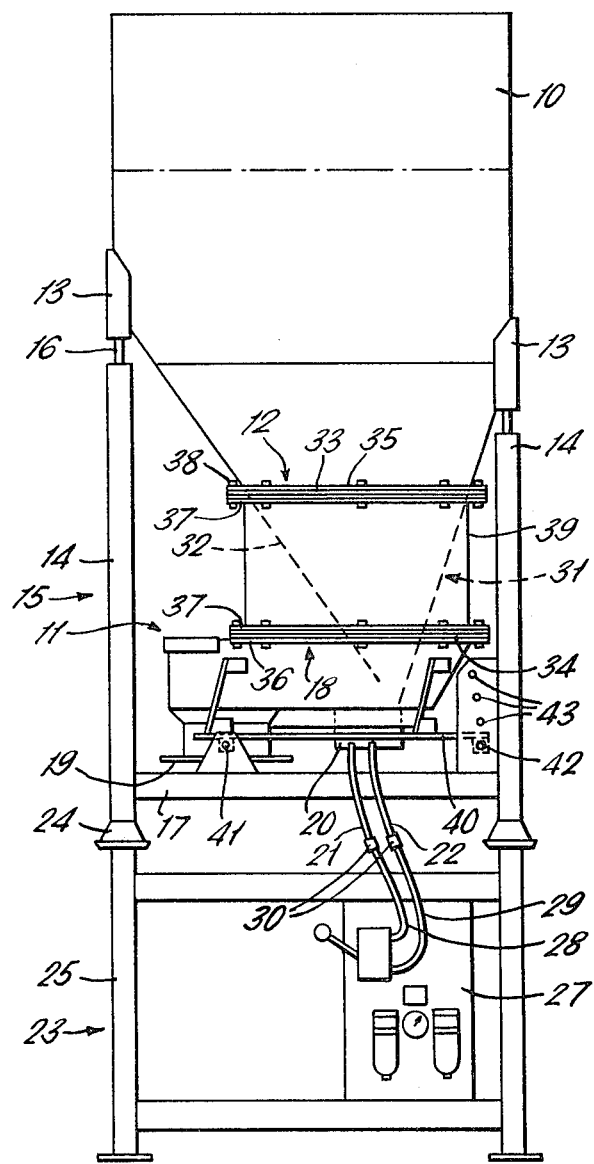
FIG. 1 is an elevation, by way of example, of apparatus for discharging material from a bulk container.
Figure 2:
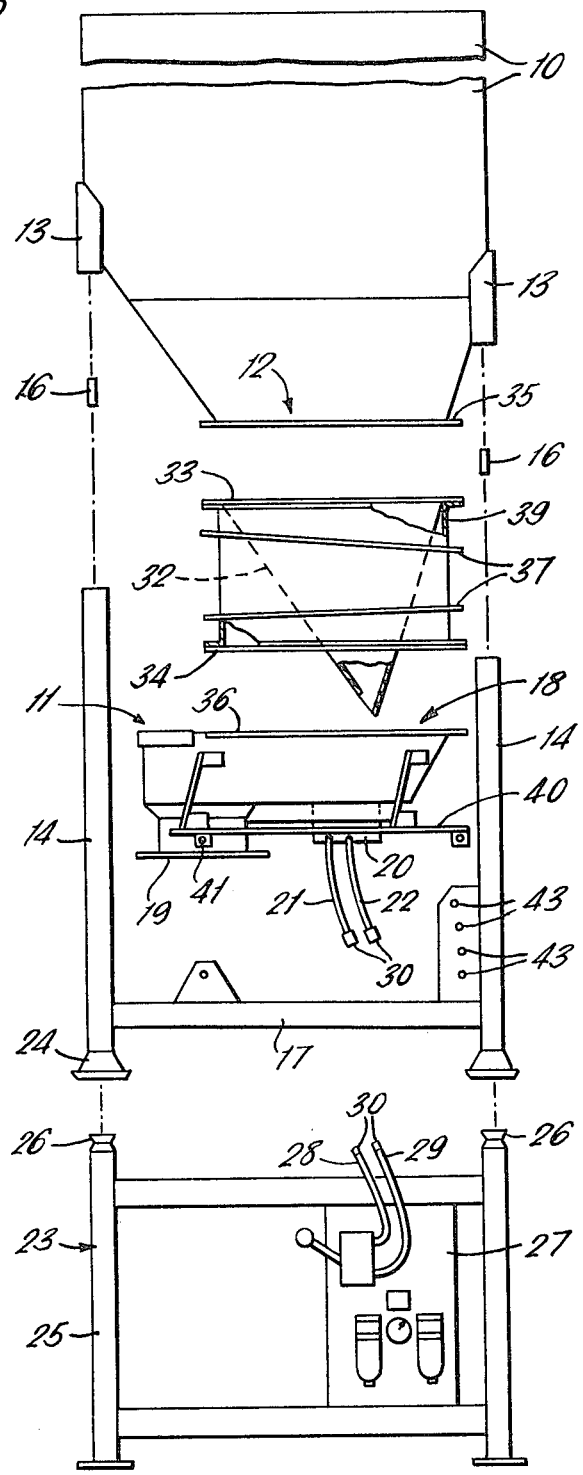
FIG. 2 is an exploded view of the apparatus of FIG. 1.

Referring to FIGS. 1 and 2, there is provided a mobile unit comprising a container 10 and vibratory delivery means for conveying material therefrom at the required rate of feed. In this embodiment, the container 10 is of rectangular cross-section and has a discharge opening 12 in its base of similar cross-section. The container is also shaped to assist the emptying of material through the discharge opening. At each corner of the container 10 is a leg 13 which is attached to a respective leg 14 of a frame 15 by a semi-rigid mounting 16 designed to allow the transmission of vibrations from the frame to the container but to reduce the noise which would occur by providing solid connections. If desired, each mounting 16 may be designed to minimise the transmission of vibrations from the frame 15 to the container 10.

The frame 15 also has cross-members 17 on which are mounted the delivery means which, in this embodiment, is a tray feeder 11, having an upwardly open inlet 18 beneath the discharge opening of the container 10, and a downwardly open outlet 19 for discharging material into another container or onto a conveyor belt (not shown). The tray feeder 11 is of conventional design and is operated by a pneumatic vibrator 20 having air feed pipes 21, 22. The rate of flow of the material through the tray feeder 11 may be varied by controlling the vibrator 20. The rate of flow may also be varied by altering the angle of the tray feeder relative to the direction of flow of the material from the container. For this purpose, the tray feeder is mounted on a plate 40 which is hinged about a horizontal axis 41 and is held at a selected angle to the horizontal by two bolts 42 (only one of which is shown). In this embodiment, the provision of holes 43 allow the plate and thus the tray feeder to be angled at 0°, 5°, 10° or 15° to the horizontal.

A further manner of varying the rate of flow through the tray feeder is by changing the relative positions of the inlet 18 and the discharge opening 19. For example, in some circumstances it may be desirable to provide a tray feeder having the discharge opening 19 positioned substantially directly below the inlet 18 instead of being offset therefrom as shown in FIGS. 1 and 2, even if only when the tray feeder is angled at its maximum. At least a portion of the material will then be able to flow under gravity alone.

The frame 15 of the mobile unit is designed to rest on a second support frame 23, and for this purpose the legs 14 of the frame 15 have inverted cup-shaped feet 24 to locate on respective uprights 25 of the second frame 23. Also mounted on the uprights 25 are resilient isolation mountings 26 which minimise the transmission of vibrations from the frame 15 to the frame 23 whereby, in operation, the frame 23 remains static and hence the unit does not move laterally. Control means 27 for the pneumatically operated tray feeder 11 are mounted on the second frame 23 and air supply pipes 28, 29 are connected to the pipes 21, 22 respectively by quick-release couplings 30 which when released allow ready removal of the unit from the frame 23 by, for example, a forklift truck.

Within a protective cylindrical shroud 39, a duct 31 connects the discharge opening 12 of the container 10 to the inlet 18 of the tray feeder 11. This duct is formed of a flexible, substantially, non-stretchable material which, in this embodiment, is neoprene coated nylon, and comprises a longitudinal wall 32 defining a passage for allowing the material to pass from the container into the tray feeder, and two exterior flanges 33, 34 which are sandwiched between respective flanges 35, 36 surrounding the discharge opening 12 of the container 10 and the inlet 18 of the tray feeder 11 and respective ring shaped plates 37 and held in position by bolts 38, which may be quick-release bolts. Since, in this embodiment, the container 10 has a rectangular discharge opening 12, the duct 31 has a rectangular cross-section and the flanges 33 to 36 and the plates 37 are similarly rectangular. In a modified embodiment in which the container 10 has a circular cross-section, the discharge opening 12 of the container and the inlet 18 to the tray feeder 11 are preferably circular. In this case, the duct 31 will be of circular cross-section and the flanges 33 to 36 and plates 37 of annular construction. In both embodiments the wall 32 of the duct 31 defines a conical passage which is convergent in the downward direction and preferably, as shown, projects below the flange 34 into the tray feeder 11 to control the bed depth therein. The opening at the bottom end of the duct 31 is also directed downstream of the tray feeder to assist the passage of the material in that direction. If the vibratory feeder is tilted, a new duct of the required shape must be fitted between the container 10 and the delivery conveyor 11.

It will be appreciated that for a given size of discharge opening 12 in the base of the container 10, the rate of flow to the tray feeder 11 may be varied by increasing or decreasing the area of the outlet end of the duct 31, but the duct must always remain convergent. For the discharge of most materials from the container 10, it is sufficient that the flange 34 is formed of a flexible, substantially non-stretchable material and is taut so that it effectively transmits the vibrations from the tray feeder 11 to the longitudinal wall 32 of the duct 31. Similarly, the longitudinal wall 32 of the duct 31 and the flange 33 are formed of the same material or the same type of material and are taut so that they effectively transmit the vibrations to the material within the duct 31 and to the container 10. The material will thereby be caused to flow through the duct 31 into the tray feeder 11. The tautness of the longitudinal wall 32 of the duct 31 also ensures that it minimises the downward load of the material on the tray feeder 11. If desired, in order to assist the longitudinal wall 32 of the duct 31 to carry the load of the material, the longitudinal wall may at least initially be inwardly convex, e.g. hyperbolic.

Figure 3:
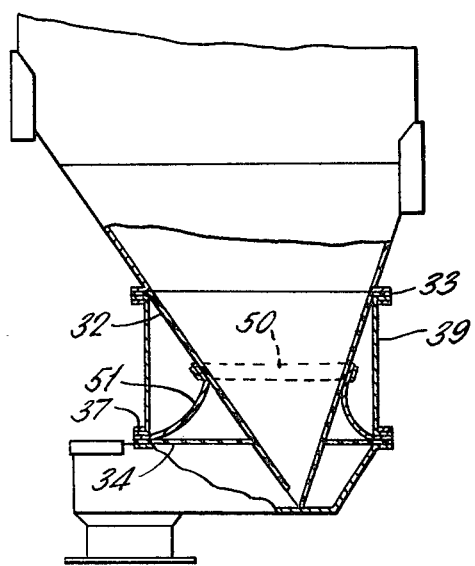
FIG. 3 is an enlarged view, in section, of a modified flexible portion for the apparatus of FIG. 1.

FIG. 3 relates to a modified duct 31 in which the tautness of the longitudinal wall can be increased, if necessary, to prevent a material which is difficult to discharge from bridging at the top end of the duct. For this purpose, the duct 31 has a ring 50 of metal or fabric attached in a suitable manner, e.g. stitching in the case of a fabric ring 50, to the external surface of the longitudinal wall 32 approximately mid-way between the flanges 33, 34, and a number of tapes 51 each connected at one end to the ring 50 and passing beneath the bottom flange 37, i.e. the one which is nearer the inlet 18 of the tray feeder 11. The tapes 51 are thereby held between that flange 37 and the bottom flange 34 of the duct. Tightening the tapes 51 increases the tautness of the longitudinal wall 32 above the ring 50 and thereby increases the activation of the top portion of the duct 31.

In operation, the mobile unit comprising the tray feeder 11 mounted on the frame 15, the container 10 and the particular connecting duct 31 which is appropriate to the selected angle of the tray feeder, are assembled together. The container 10 is then filled with material and the unit is lifted onto the static frame 23 with the discharge opening 19 of the tray feeder above a second container or a conveyor onto which material from the container 10 is to be discharged. The air supply pipes 28, 29 are coupled to the pipes 21, 22 of the vibrator 20.

To discharge material from the container 10, the vibrator 20 is switched on to operate the tray feeder 11, the vibrations of which are transmitted to the container, and hence the material therein, both through the duct 31 and through the frame 15. The material is thereby caused to be discharged from the container 10 through the discharge opening 19 of the tray feeder 11 at a rate determined mostly by the speed of operation of the tray feeder.

The main advantage of the embodiment described above is that it provides a system of discharging material from a bulk container which combines a container and vibratory delivery means as a unit, thereby making it suitable for discharging the material from the container either continuously or intermittently at a rate of flow determined by the delivery means. This feature is particularly advantageous when only a small amount of the material is required for a process. The mobile unit may then be lifted off the frame 23 and shelved until a further amount of material is required to be discharged. In the meantime, a further mobile unit containing a different material may be lifted onto the frame 23.

Another advantage is that the container 10 does not have to be provided with independently operated vibrators, thereby enabling the level controls normally provided in the container and the delivery means to be eliminated, it being found that the vibrations from the delivery means can be transmitted to the container via the duct 31 and, if desired, via the frame 15 sufficiently effectively to cause discharge of the material irrespective of its flow characteristics.

A further advantage is that by mounting the delivery means on the same frame 15 as the container, the mass weight of the delivery means may be reduced compared with delivery means known hitherto.

The invention is not limited to the specific details of the embodiment described above. For example, other vibratory delivery means instead of a pneumatically operated tray feeder may be employed to convey material from the flexible duct 31 to the desired point of discharge. The pneumatically operated tray feeder is suitable because it is readily capable of discharging the material at a variable rate of flow and, if desired, in metered amounts. However, the feeder may be electrically activated by an electro-magnetic actuator, or a hydraulic vibrator having an electrically driven pump. Furthermore, a feeder of tubular section may be preferred, for example a screw conveyor.

Also the provision of the mountings 16 readily permit other containers of different size and shape to be mounted on the same frame 15.

Furthermore the invention may be applied to discharging material from fixed bulk containers, e.g. silos or hoppers, instead of the container of a mobile unit as described above. In such a case, the two frames need not be provided except, if desired, as mounting means for the container and/or the delivery means.

I claim:

1. Apparatus for discharging material from a bulk container having a discharge opening in its base, vibratory delivery means for conveying material from said opening of the container to a second discharge opening, the delivery means having an inlet connected to the discharge opening of the container by means including a flexible but non-stretchable and non-metallic member defining a duct and means for vibrating the delivery means, characterized in that to assist the passage of the material from the container to the delivery means the flexible but non-stretchable member is convergent in the downward direction and is arranged to transmit vibration from the delivery means to the container, said member being releasably connected to said container and said delivery means, said apparatus comprising a mobile unit, there being provided a frame for supporting both the container and the delivery means, and a second support frame, the frame of the mobile unit having feet for resting on the second frame, and the second frame providing means for minimizing the transmission of vibrations from the delivery means to the second frame.

2. Apparatus as claimed in claim 1, wherein the frame is constructed so that vibrations from the delivery means are fed through the frame to the container.

3. Apparatus as claimed in claim 1, wherein control means for the delivery means are mounted on said second frame, the control means being coupled to the delivery means by quick-release couplings to allow ready removal of the mobile unit from the second frame.

4. Apparatus as claimed in claim 1, wherein the flexible portion of the connecting means comprises a longitudinal wall defining said duct for allowing the material to pass from the container to the delivery means and two external flanges for attaching the connecting means to the container adjacent its discharge opening and to the delivery means adjacent its inlet respectively.

5. Apparatus as claimed in claim 4, wherein the longitudinal wall extends beyond the flange attaching the connecting means to the delivery means whereby the longitudinal wall projects a desired distance into the delivery means.

6. Apparatus as claimed in claim 4, wherein means are provided for increasing the tautness of the top portion of the longitudinal wall of the flexible portion, which means comprises a plurality of tapes attached to the longitudinal wall externally thereof and means for holding the tapes tight.

7. Apparatus as claimed in claim 4, wherein the delivery means is a tray feeder capable of discharging material at a variable rate of feed.

8. Apparatus as claimed in claim 1, wherein the delivery means is hinged to allow the angle of the delivery means relative to the direction of the flow of the material from the container to be varied.

* * * * *